(12) United States Patent
Otter

(10) Patent No.: US 7,634,899 B2
(45) Date of Patent: Dec. 22, 2009

(54) METHOD AND APPARATUS FOR INSTALLING AND TENSIONING TRACK ASSEMBLIES ON SKID STEER LOADERS

(76) Inventor: Arnold A. Otter, 35427 S. HWY 213, Molalla, OR (US) 97038

( * ) Notice: Subject to any disclaimer, the term of this patent is extended or adjusted under 35 U.S.C. 154(b) by 0 days.

(21) Appl. No.: 12/321,194

(22) Filed: Jan. 16, 2009

(65) Prior Publication Data

US 2009/0183489 A1 Jul. 23, 2009

Related U.S. Application Data

(60) Provisional application No. 61/062,039, filed on Jan. 23, 2008.

(51) Int. Cl.
*B21L 21/00* (2006.01)
(52) U.S. Cl. .................. 59/7; 59/11; 59/35.1; 269/253; 254/100
(58) Field of Classification Search ........................ 59/4, 59/7, 11, 35.1; 269/253; 254/100
See application file for complete search history.

(56) References Cited

U.S. PATENT DOCUMENTS

| 2,332,607 | A | * | 10/1943 | Schroeder et al. | 59/7 |
| 2,440,512 | A | * | 4/1948 | Jakoubek et al. | 59/7 |
| 3,379,005 | A | * | 4/1968 | Jones | 59/7 |
| 4,394,810 | A | * | 7/1983 | Womble | 59/7 |
| 4,429,525 | A | * | 2/1984 | Doak | 59/7 |
| 6,032,455 | A | * | 3/2000 | Reimann | 59/11 |

* cited by examiner

*Primary Examiner*—David B Jones
(74) *Attorney, Agent, or Firm*—Mark S. Hubert

(57) ABSTRACT

A tool for the quick and easy installation and tensioning of track assemblies on skid steer loaders is arranged to properly and positively align and draw the free ends of the track together and hold the track ends in proper, aligned condition squared relative to each other for installation of the track link members and tensioning adjustment of the track as may be desired for proper operation of the vehicle. Additionally, this tool can be used to dismount the track by removing the pressure from the pivot bolts, allowing the operator to easily remove the bolts and then gently let the ends of the tracks apart.

9 Claims, 4 Drawing Sheets

METHOD AND APPARATUS FOR INSTALLING AND TENSIONING TRACK ASSEMBLIES ON SKID STEER LOADERS

This application incorporates herein aby reference and claims under 35 U.S.C. 119, the right of priority and the benefit of earlier filing date of provisional application No. 61/062,039 filed Jan. 23, 2008. Both this application and the provisional application have the same inventor.

BACKGROUND OF THE INVENTION

The present invention relates to a method and apparatus for installing and tensioning track assemblies on skid steer loaders and other wheeled vehicles for increased mobility of a vehicle over adverse ground surfaces and conditions during operation of the vehicle. Track assemblies are best identifiable to the layman as being generally similar to the track assembly seen on military tanks, tractors, etc. The method and apparatus for installing and tensioning track assemblies affords savings in time, manpower, and safety by allowing a single individual to quickly install or tighten steel tracks.

As those skilled in the construction, landscaping, excavation and many other industries are well aware, it is often desirable and even necessary to apply an endless track assembly over and around the front and rear wheel and tire assemblies on each side of skid steer type vehicles to effectively change the wheeled vehicle into a track type vehicle in order to afford the vehicle desired and necessary mobility over the ground surface in adverse terrain and ground surface conditions.

Currently the process of installing tracks is laborious and frustrating, and either involves a ratcheting load strap or ropes, which makes the final alignment for insertion of the bolts very tedious. Should the strap or ropes slack, the alignment of the tracks can vary by inches.

The present invention holds the tracks completely square with one another. Then, through the use of a screw, the final adjustment can be made to the smallest degree to achieve the proper alignment. The hold produced by this tool is positive and secure, which makes track installation or tensioning occur in a fraction of the time. Additionally, this tool can be used to dismount the track by removing the pressure from the pivot bolts, allowing the operator to easily remove the bolts and then gently let the ends of the tracks apart.

Henceforth, a quick and easy method and apparatus for installing and tensioning track assemblies on skid steer loaders would fulfill a long felt need in the track driven equipment industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to allow a single installer the ability to quickly install and tighten track assemblies (or loosen and remove)for skid steer loaders.

It has many of the advantages mentioned heretofore and many novel features that result in a new apparatus and method for installing and tensioning track assemblies that is not anticipated, rendered obvious, suggested, or even implied by any of the prior art, either alone or in any combination thereof.

In accordance with the invention, an object of the present invention is to provide an improved apparatus for the installation and tensioning of track assemblies that is capable of holding the tracks parallel and completely square with one another.

It is another object of this invention to provide an improved apparatus for the installation and tensioning of track assemblies that allows very small adjustments to the tensioning of track assemblies.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
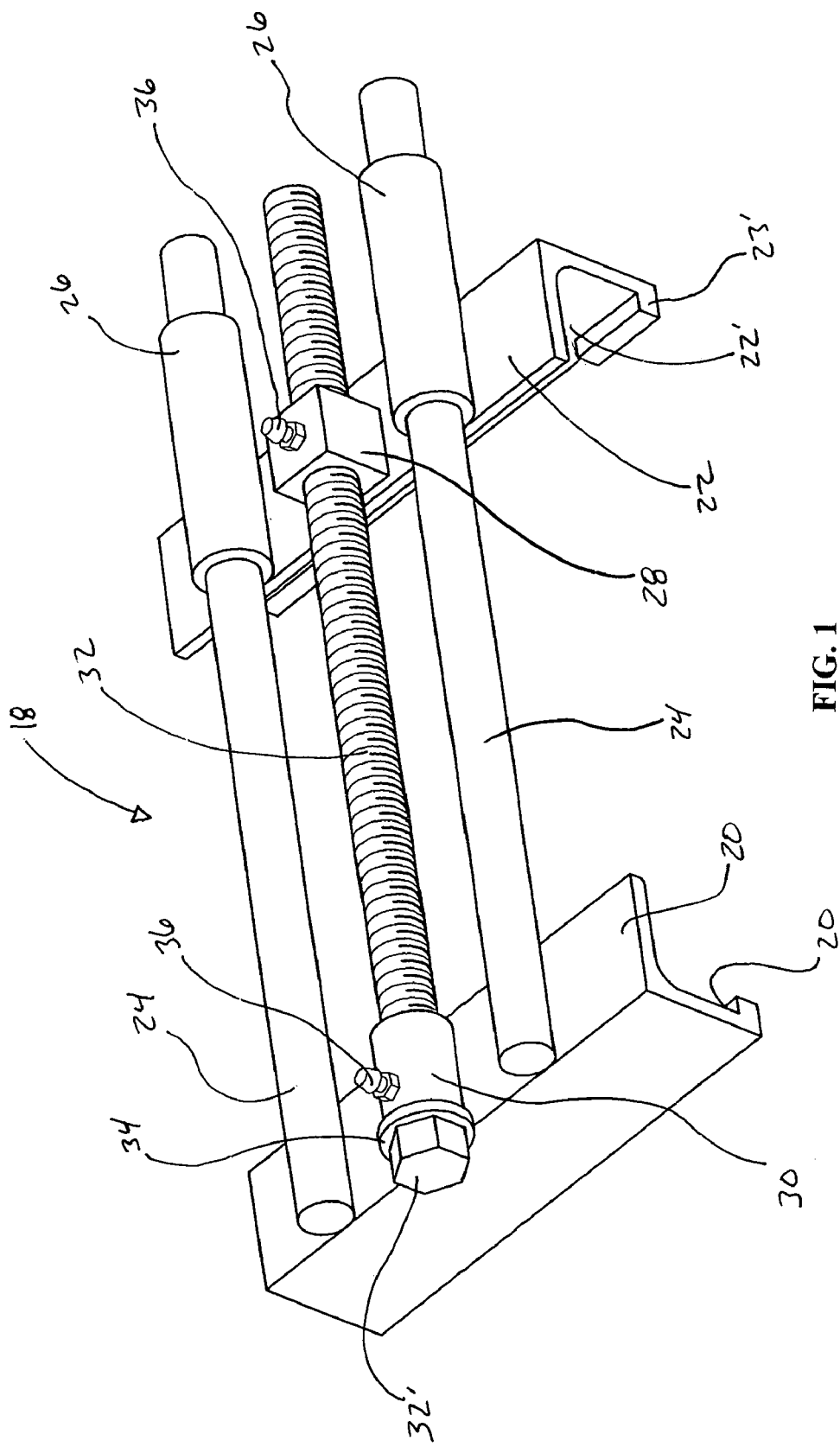
FIG. 1 is a perspective view of the track installation and tensioning apparatus.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 2:
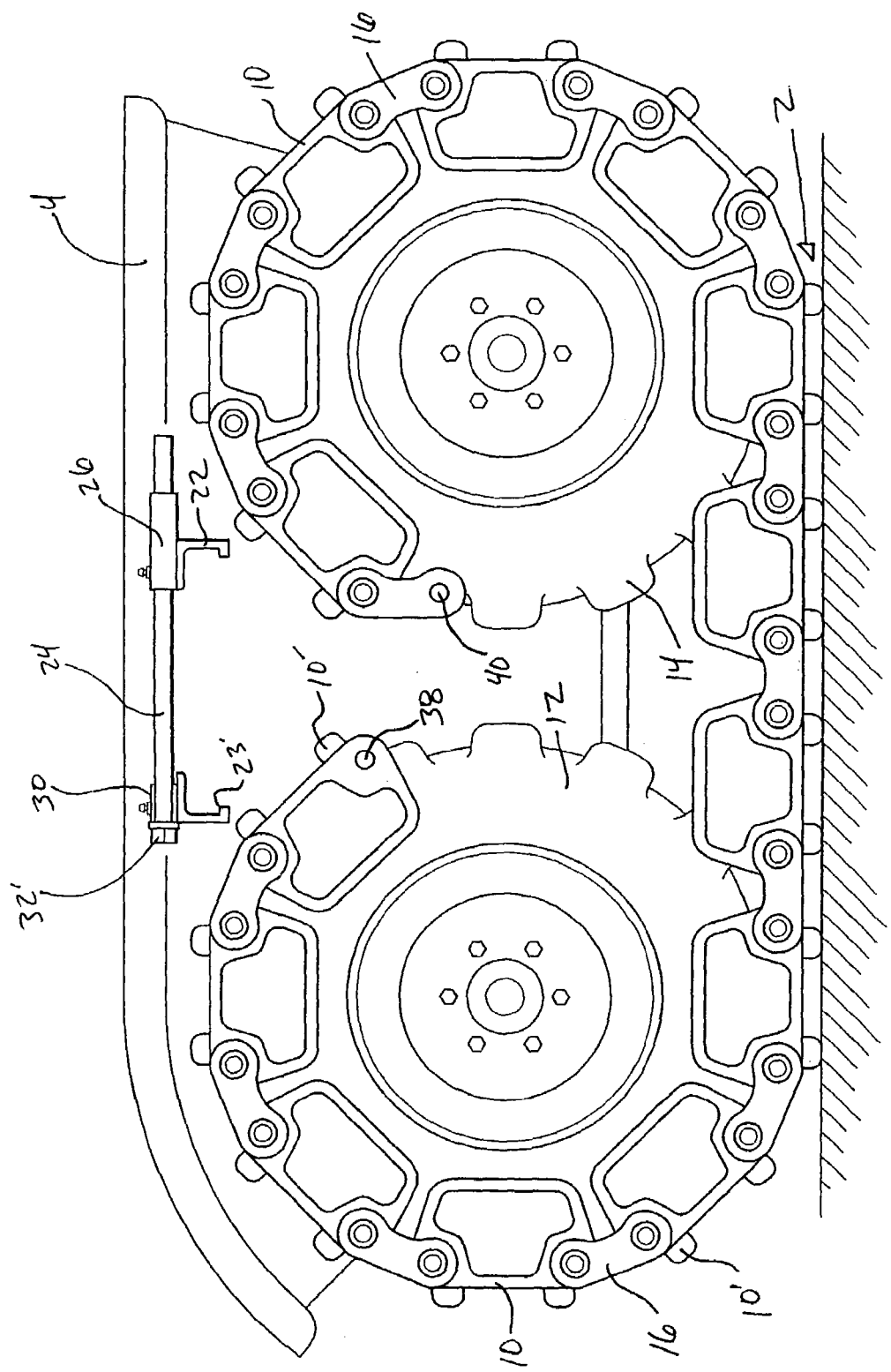
FIG. 2 is a side elevation view of the track installation and tensioning apparatus positioned over the unconnected terminal ends of the track assembly.

Looking at FIG. 2, track assembly 2, is provided in longitudinally elongated lengths of pad members 10 joined together at their opposite terminal ends to form an endless track having an overall length sufficient to fully encircle the spaced apart, front and rear wheel and wheel assemblies 12, 14 on each side of a vehicle 4. Once track assembly 2 is positioned to encircle the wheel assemblies 12 and 14, the free, opposite terminal ends of the track assembly 2 are manually drawn together with ropes, pry bars, ratchet strap assemblies, or other force-applying tools, and track link members 16 are connected to the confronting pad members 10 at the open free ends of the track assembly 2 to secure the pad members 10 together and form an endless track assembly encircling the wheel assemblies 12, 14.

The apparatus of the present invention provides a tool 18 arranged to properly and positively align and draw the free ends of the track assembly 2 together and hold the pad members 10 in proper, aligned condition, squared relative to, and parallel to each other for installation of the track link members 16 and tensioning adjustment of the track assembly 2 as may be desired for proper operation of the vehicle 4.

Referring now to FIG. 1 of the drawings, there is shown a preferred embodiment of a track installation and tensioning tool 18. As shown, the tool 18 includes a pair of opposing, track-engaging jaw members 20, 22 secured together in facing condition for movement of the jaw members along interconnecting guide members 24 linearly toward and away from each other. The inner, facing sides 20', 22' of jaw members 20, 22 are configured to fully engage track members 10' that extend laterally across each of the pad members 10 of the track 2, and as such are configured to conform to the physical configuration of track members 10'. Inner facing sides 20', 22' have an "L" shaped configuration with a short flange 23' extending normally therefrom so as to cradle three sides (two sides fully and one side partially) of the track members 10' as is apparent particularly in viewing FIGS. 1 and 3. In this regard, one jaw member 20 fixedly mounts one longitudinal end of each guide member 24, and the other jaw member 22 mounts a pair of guide sleeve members 26, shown herein as tube members 26, each arranged to receive one of the guide members 24 for longitudinal sliding movement of the jaw member 22 along the guide members 24 toward and away from the jaw member 20. Means is provided for operatively interconnecting and mechanically moving the opposite jaw members 20, 22 positively toward and away from each other. In the embodiment illustrated herein, the jaw member 22 fixedly mounts a block member 28 having an internally-threaded bore provided therethrough, the jaw member 20 mounting a guide sleeve tube 30 having an internal bore extending therethrough arranged to receive a longitudinally elongated tensioning bolt 32 for substantially free rotation within the bore of the guide sleeve 30. As will be apparent to those skilled in the art, the internally threaded bore of the block member 28 is configured to operatively engage the threaded bolt 32. A friction washer 34 is preferably provided between the outer terminal end of the sleeve 30 and the head 32' of the bolt 32 to protect the parts from binding, wear and excessive friction and damage when the bolt 32 is turned by wrench or other suitable tool as will be explained. Also, grease fittings 36 may be provided on the block member 28 and sleeve member 30 to permit periodic lubrication of their interior confines as may be needed or desired.

Figure 3:
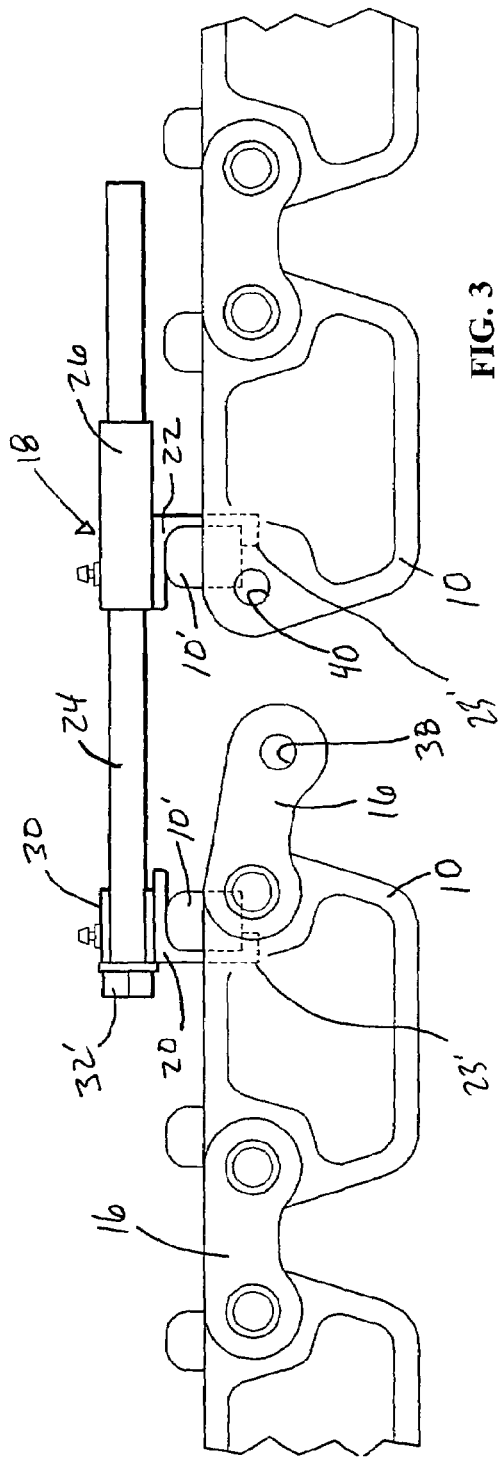
FIG. 3 is a side elevation view of the frictional clamping engagement of the track installation and tensioning apparatus with a track assembly.
Figure 4:
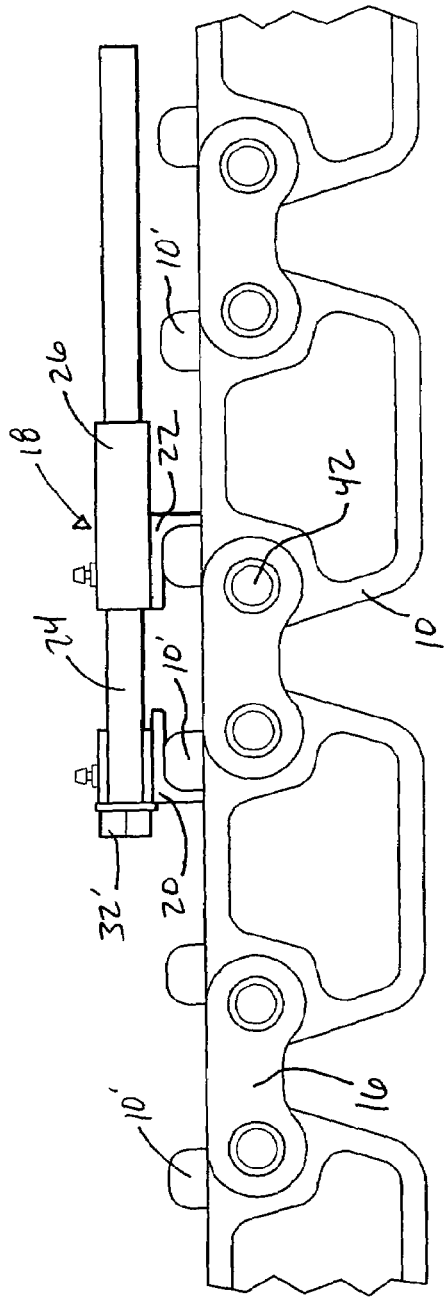
FIG. 4 is a side elevation view of the track installation and tensioning apparatus tightened such that the opposite free terminal ends of the track assembly have been brought into alignment for reception of a connector bolt.

FIGS. 2-4 illustrate the operation of tool 18 in installing a track assembly 2 into operative, tensioned condition on a skid steer vehicle 4. As those skilled in the art will recognize, a pair of disconnected, elongated track assemblies 2 are first laid out in longitudinally-elongated, longitudinally extending condition on a ground surface, and the vehicle 4 is driven on to the track assemblies 2 so that the front and back wheel assemblies 12, 14 of the vehicle 4 are disposed on the track assemblies 2 substantially centrally of their overall length. The free, opposite terminal ends of the track assemblies 2 are then manually drawn around the front and the rear wheels 12, 14 of the vehicle 4 on respective sides of the vehicle 4, as is shown in FIG. 2 (only one side of vehicle 4 is visible). Tool 18 is then positioned over the unconnected, confronting pad members 10 defining the free terminal ends of the track assembly 2 on one side of the vehicle 4, and the opposite jaw members 20, 22 are moved linearly, by rotation of the tensioning bolts 32 of the apparatus, to capture the confronting track members 10' of the endmost free pad members 10 of the track assembly 2 in frictional clamping engagement, as is shown in FIG. 3 of the drawings. Without, flange 23' track members 10' would tip towards each other as the tensioning tool 18 was tightened, causing the tool 18 to slip off.

As is evident in viewing FIG. 4, the tensioning bolt 32 is then turned, as by wrench or other tool, to draw the opposite free terminal ends of the track assembly 2 toward each other. Through the use of the two guide members 24 and guide sleeves 26, the jaw members 20, 22 are advanced toward each other, terminal pad members 10 are advanced towards each other in a parallel configuration with square alignment until the unconnected link members 16 on each lateral side of the track assembly 2 are positioned so that corresponding bores 38, 40 through the link members 16 and pad members 10 are brought into mutually aligned condition for passage therethrough of connector bolts 42 and lock nuts 44 (FIG. 5) which join the track assembly 2 together into an endless loop encircling the wheel (and tire) assemblies 12, 14 on one side of the vehicle 4. Bushings 46 are also preferably provided between the bores 38, 40 and connector bolts 42 as is standard practice to minimize wear and friction in the resulting connection. The aforementioned installation process is then repeated using tool 18 on the yet-to-be-connected track assembly 2 on the opposite side of the vehicle 4. Properly tensioned, the track assembly 2 should have a degree of slack evidenced by a slight sagging of the track between the top of the front and rear wheel assemblies 12, 14 in the range of approximately 1 inch to 2 inches, and preferably 1 inch to 1½ inches, from a straight line extending between the tops of the wheels (tires). Less slack than this in the track assemblies places a substantial strain on the internal drive and bearing components of the vehicle and creates undue friction and stress on the track bushings and bolts with consequent shortened wear life and increased replacement and maintenance requirements of the track assemblies.

Figure 5:
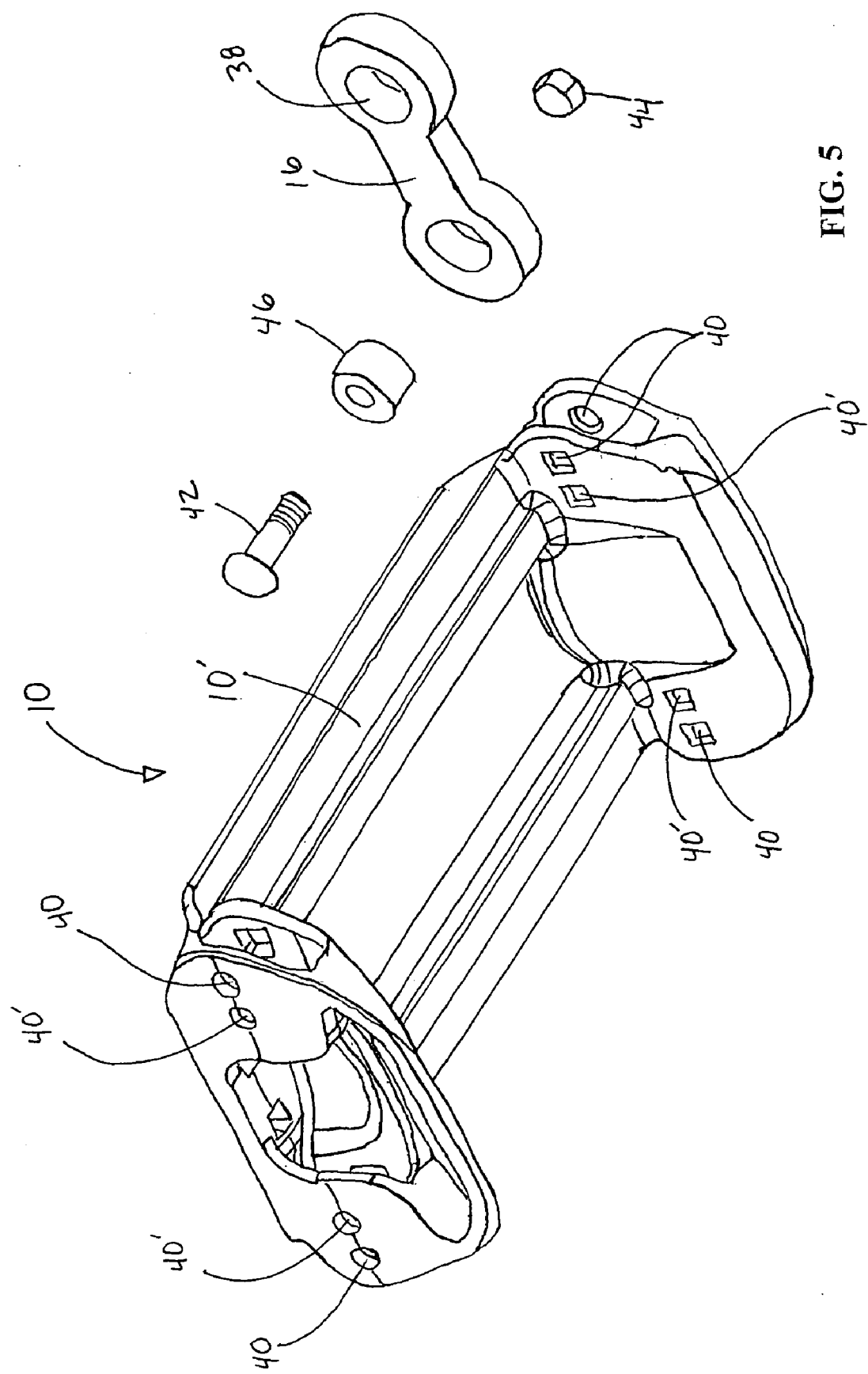
FIG. 5 is a perspective view of a pad member, a connector bolt, a lock nut, a bushing, and link member.

Initially the track assemblies 2 are installed on a vehicle 4 as will be understood best in viewing FIG. 5 of the drawings, all the connector link members 16 engage corresponding, adjacent pad members 10 through connector bolt bores 40 provided adjacent the opposite outer terminal ends of each pad member 10. In the event that, once so installed the track assemblies 2 are determined to be too loose, then the connector bolts 42 of one lateral set of connector link members 16 may be removed, and the tool 18 operated to draw the pad members 10 further toward each other so that the bore 38 of the link member 16 is brought into alignment with a second connector bore 40' positioned a spaced distance inwardly of the bores 40, whereupon the connector bolts 42 and lock nuts 44 are reinstalled. In this manner, the adjacent pad members 10 may be connected together, thus shortening the overall length of the endless track assembly encircling the wheel assemblies 12, 14 by the distance provided between the connector bores 40, 40'. If the track assembly 2 is still too loose on the vehicle 4, the aforementioned link tensioning adjustment procedure may be repeated between additional, selected adjacent pad members 10 until the proper track assembly length and tension has been achieved. This procedure may also be repeated as needed to take up slack or looseness in the track assemblies 2 as the track assemblies stretch and wear over time as a routine maintenance procedure.

From the foregoing it will therefore be apparent that the present invention provides an apparatus that is arranged to simplify, facilitate and assure the easy installation and removal of track assemblies onto skid steer loader vehicles while maintaining and assuring proper alignment of the confronting ends of the pad members to be connected together throughout the installation and removal processes. The apparatus is further arranged to facilitate the proper tensioning of the endless track assemblies on the vehicle both during installation process and subsequent, periodic maintenance and servicing routine.

It will also be apparent from the foregoing that the apparatus of this invention 18, by virtue of the configuration of the jaw members 20, 22 engagement of each tread 10' of the confronting pad members 10 being arranged to extend laterally across the full width of the track assembly 2, the tool 18 assures that the pad members 10 are continuously maintained in proper, aligned condition relative to each other for easy and non-binding engagement of connector bolts 42 between pad members 10 at all times during installation and tensioning operations of the tool 18. This also minimizes the chances of having to re-tighten the track assembly 2.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A track installation and tensioning tool comprising:
 a pair of identical opposing, facing L-shaped track-engaging first and second jaw members;
 a pair of guide members having distal and proximate ends adapted for the linear, interconnecting movement of said jaw members toward and away from each other having distal and proximate ends;
 a pair of guide sleeve members to matingly house said guide members for sliding engagement;
 a means for the operatively interconnecting and mechanically moving said jaw members positively toward and away from each other;
 wherein first jaw member fixedly mounts said guide members at said proximate ends and second jaw member fixedly mounts to said sleeve members, and wherein said sleeve members are slidingly engaged with said guide members at said distal ends.

2. The track installation and tensioning tool of claim 1 further comprising:
 a block member having an internally-threaded bore provided therethrough;
 a guide sleeve tube having an internal bore extending therethrough;
 wherein said first jaw member, fixedly mounts said guide sleeve tube and said second jaw member fixedly mounts said block member; and
 wherein said means for moving said jaw members comprises an elongated, threaded, tensioning bolt configured to slidingly engage said orifice of said sleeve tube and matingly engage said orifice of said block member, and wherein said tensioning bolt further comprises a hex head affixed to a proximate end and a distal end of said tensioning bolt.

3. The track installation and tensioning tool of claim 2 wherein said block member resides at the midpoint of the longitudinal axis of said second jaw member; and wherein said guide sleeve tube resides at the midpoint of the longitudinal axis of said first jaw member.

4. The track installation and tensioning tool of claim 3 wherein said jaw members further comprise a flange extending normally therefrom for the partial engagement of a third side of said track members.

5. The track installation and tensioning tool of claim 4 wherein said guide wherein said guide members have longitudinal axes that are parallel to each other.

6. The track installation and tensioning tool of claim 5 wherein said tensioning bolt has a longitudinal axis that is parallel to said longitudinal axes off said guide members.

7. A track installation and tensioning tool comprising:
 a first and second, parallel, opposing, facing "L" shaped track-engaging jaw members each comprising a flange extending normally therefrom for engagement of three sides of a track member;
 a pair of parallel guide members, having distal and proximate ends, for the linear, interconnecting movement of said jaw members toward and away from each other;
 a pair of parallel guide sleeve members to matingly engage said guide members;
 a block member having an internally-threaded bore provided therethrough;
 a guide sleeve tube having an internal bore extending therethrough
 an elongated, threaded, tensioning bolt configured to slidingly engage said orifice of said sleeve tube and matingly engage said orifice of said block member for the operatively interconnecting and mechanically moving said jaw members positively toward and away from each other;
 wherein tensioning bolt has a longitudinal axis that resides parallel said guide members;
 wherein said first jaw member fixedly mounts said guide members at said proximate ends and said second jaw member fixedly mounts to said sleeve members, and wherein said sleeve members are slidingly engaged with said guide members at said distal ends; and
 wherein said first jaw member, fixedly mounts to said guide sleeve tube and said second jaw member fixedly mounts to said block member.

8. A method for the installation and tighten of track assemblies around a vehicle's wheel and tire assemblies comprising the steps of:
 1) laying out a pair of disconnected, elongated track assemblies in a longitudinally-elongated, condition on a ground surface;
 2) driving a vehicle onto the track assemblies so that the front and back wheel assemblies of the vehicle are disposed on the track assemblies substantially centrally of their overall length;
 3) drawing the free, opposite terminal ends of the track assemblies around the front and the rear wheels assemblies on each of the respective sides of the vehicle;
 4) positioning a tool comprising:
 a pair of opposing, facing "L" shaped track-engaging jaw members each comprising a flange extending normally therefrom for engagement of three sides of a track member;
 a pair of guide member for the linear, interconnecting movement of said jaw members toward and away from each other having distal and proximate ends;
 a pair of guide sleeve members to matingly engage said guide members;
 a block member having an internally-threaded bore provided therethrough;

a guide sleeve tube having an internal bore extending therethrough an elongated tensioning bolt configured to slidingly engage said orifice of said sleeve tube and matingly engage said orifice of said block member or the operatively interconnecting and mechanically moving said jaw members positively toward and away from each other;

5) moving opposing jaw members linearly, by rotation of the tensioning bolt of said tool, to capture the confronting track members of said pad members of said track assembly in frictional clamping engagement;

6) further turning said tensioning bolt, to draw said pad members toward each other in a parallel configuration with square alignment until the unconnected link members on each lateral side of said pad members are aligned;

7) inserting connector bolts and lock nuts, joining said track assembly into an endless loop encircling the said front and back wheel assemblies;

8) repeating said process on the opposite side of said vehicle.

9. The method for the installation and tightening of track assemblies around a vehicle's wheel and tire assemblies of claim 8 wherein one jaw member fixedly mounts said guide members at said proximate ends and one jaw member fixedly mounts to said sleeve members, and wherein said sleeve members are matingly engaged with said guide members at said distal ends; and wherein said jaw member fixedly mounted at said proximate ends of said guide members, fixedly mounts said guide sleeve tube and said jaw member fixedly mounted to said sleeve members at said distal ends of said guide members fixedly mounts said block member, over the unconnected, confronting pad members defining the free terminal ends of the track assembly on one side of the vehicle.

* * * * *